United States Patent
Waggoner et al.

(10) Patent No.: US 12,452,478 B1
(45) Date of Patent: Oct. 21, 2025

(54) COMPUTER-IMPLEMENTED METHODS FOR COMBINING DYNAMIC METADATA FOR MULTIPLE VIEW (MULTIVIEW) VIDEO DISPLAYING

(71) Applicant: Amazon Technologies, Inc., Seattle, WA (US)

(72) Inventors: Charles Benjamin Waggoner, Portland, OR (US); Yongjun Wu, Bellevue, WA (US); Amarsingh B. Winston, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/746,947

(22) Filed: Jun. 18, 2024

(51) Int. Cl.
*H04N 21/431* (2011.01)
*H04N 9/77* (2006.01)
(Continued)

(52) U.S. Cl.
CPC .......... *H04N 21/4312* (2013.01); *H04N 9/77* (2013.01); *H04N 21/21805* (2013.01); *H04N 21/435* (2013.01)

(58) Field of Classification Search
CPC ................ H04N 21/4312; H04N 9/77; H04N 21/21805; H04N 21/435
See application file for complete search history.

(56) References Cited

U.S. PATENT DOCUMENTS

2010/0128121 A1\* 5/2010 Wilkinson ............ G06T 19/006 348/135
2017/0099513 A1\* 4/2017 Furbeck ........... H04N 21/85406
(Continued)

OTHER PUBLICATIONS

Consumer Technology Association, "HDR Static Metadata Extensions", Document No. CTA-861.3-A, Jul. 2016, 17 pages.
(Continued)

*Primary Examiner* — Michael Lee
(74) *Attorney, Agent, or Firm* — NICHOLSON DE VOS WEBSTER & ELLIOTT LLP

(57) ABSTRACT

Techniques for combining dynamic metadata for multiple view (multiview) video displaying are described. According to some examples, a computer-implemented method includes receiving, by a client device, a first video comprising a first set of dynamic metadata including a corresponding first color value histogram for a plurality of frames of the first video, and a second video comprising a second set of dynamic metadata including a corresponding second color value histogram for a plurality of frames of the second video; combining the first video and the second video into a combined video; generating a first combined color value histogram for a first frame of the combined video based on a first color value histogram of the first set of dynamic metadata for a first frame of the first video and a second color value histogram of the second set of dynamic metadata for a first frame of the second video, and a second different combined color value histogram for a second frame of the combined video based on a third color value histogram of the first set of dynamic metadata for a second frame of the first video and a fourth color value histogram of the second set of dynamic metadata for a second frame of the second video; performing, by a tone mapper of the client device, a tone mapping of the combined video based on the first combined color value histogram and the second different combined color value histogram to generate an output video with multiple views; and sending the output video to a display or storage.

20 Claims, 11 Drawing Sheets

(51) Int. Cl.
 *H04N 21/218* (2011.01)
 *H04N 21/435* (2011.01)

(56) References Cited

U.S. PATENT DOCUMENTS

| | | | | |
|---|---|---|---|---|
| 2017/0105042 | A1* | 4/2017 | Toma | G11B 27/3027 |
| 2018/0376194 | A1* | 12/2018 | Oh | H04N 21/4854 |
| 2019/0387134 | A1* | 12/2019 | Kozuka | H04N 9/646 |
| 2021/0201455 | A1* | 7/2021 | Park | H04N 21/440281 |
| 2021/0337174 | A1* | 10/2021 | Yagi | G11B 20/10 |
| 2023/0230618 | A1* | 7/2023 | Atkins | G11B 27/031 |
| | | | | 386/278 |

OTHER PUBLICATIONS

Consumer Technology Association, "Updates to Dynamic HDR Metadata Signaling", Document No. CTA-861.4, Mar. 2019, 37 pages.

Wikimedia Foundation, Inc., "1080p", Wikipedia encyclopedia entry, Jun. 10, 2024, 9 pages [retrieved online from en.wikipedia.org/w/index.php?title=1080p&oldid=1228277102].

Wikimedia Foundation, Inc., "Advanced Video Coding", Wikipedia encyclopedia entry, Jun. 5, 2024, 23 pages [retrieved online from en.wikipedia.org/w/index.php?title=Advanced_Video_Coding&oldid=1227369315].

Wikimedia Foundation, Inc., "HDR10", Wikipedia encyclopedia entry, Dec. 25, 2023, 3 pages [retrieved online from en.wikipedia.org/w/index.php?title=HDR10&oldid=1191774321].

Wikimedia Foundation, Inc., "High Efficiency Video Coding", Wikipedia encyclopedia entry, Jun. 10, 2024, 37 pages [retrieved online from en.wikipedia.org/w/index.php?title=High_Efficiency_Video_Coding&oldid=1228249430].

Wikimedia Foundation, Inc., "Hybrid Log-Gamma", Wikipedia encyclopedia entry, May 25, 2024, 12 pages [retrieved online from en.wikipedia.org/w/index.php?title=Hybrid_log%E2%80%93gamma&oldid=1225556159].

Wikimedia Foundation, Inc., "ICtCp", Wikipedia encyclopedia entry, May 24, 2024, 6 pages [retrieved online from en.wikipedia.org/w/index.php?title=ICtCp&oldid=1225492423].

Wikimedia Foundation, Inc., "Standard-Dynamic-Range Video", Wikipedia encyclopedia entry, Feb. 16, 2024, 3 pages [retrieved online from en.wikipedia.org/wiki/Standard-dynamic-range_video].

Wikimedia Foundation, Inc., "Ultra HD Blu-ray", Wikipedia encyclopedia entry, May 14, 2024, 6 pages [retrieved online from en.wikipedia.org/w/index.php?title=Ultra_HD_Blu-ray&oldid=1223858598].

Wikimedia Foundation, Inc., "Ultra-High-Definition Television", Wikipedia encyclopedia entry, Jun. 10, 2024, 17 pages [retrieved online from en.wikipedia.org/w/index.php?title=Ultra-high-definition_television&oldid=1228338660].

* cited by examiner

600

GENERATING A FIRST SET OF COMBINED DYNAMIC METADATA FOR A FIRST FRAME OF A COMBINED MEDIA BASED ON A FIRST SET OF DYNAMIC METADATA FOR A FIRST FRAME OF A FIRST MEDIA OF THE COMBINED MEDIA AND A SECOND SET OF DYNAMIC METADATA FOR A FIRST FRAME OF A SECOND MEDIA OF THE COMBINED MEDIA, AND A SECOND DIFFERENT SET OF COMBINED DYNAMIC METADATA FOR A SECOND FRAME OF THE COMBINED MEDIA BASED ON A THIRD SET OF DYNAMIC METADATA FOR A SECOND FRAME OF THE FIRST MEDIA OF THE COMBINED MEDIA AND A FOURTH SET OF DYNAMIC METADATA FOR A SECOND FRAME OF THE SECOND MEDIA OF THE COMBINED MEDIA
602

PERFORMING, BY A TONE MAPPER, A TONE MAPPING OF THE COMBINED MEDIA BASED ON THE FIRST SET OF COMBINED DYNAMIC METADATA AND THE SECOND DIFFERENT SET OF COMBINED DYNAMIC METADATA TO GENERATE AN OUTPUT MEDIA WITH MULTIPLE VIEWS
604

CAUSING THE OUTPUT MEDIA TO BE PRESENTED OR STORED
606

*FIG. 6*

COMPUTER-IMPLEMENTED METHODS FOR COMBINING DYNAMIC METADATA FOR MULTIPLE VIEW (MULTIVIEW) VIDEO DISPLAYING

BACKGROUND

The rapid growth of sporting events and the improvement of video production quality will likely lead to an increased demand for multiple view (multiview) streaming that enables viewers to watch different camera feeds of the same live event or different live events simultaneously. This allows users to access multiple perspectives of an event concurrently, choosing from various camera angles or perspectives of the same live event, such as a football game or a concert, while also having the option to watch different live events side by side. Multiview streaming offers users the ability to customize their viewing layout, arranging video feeds in various configurations and switching the audio feed to correspond with a specific video feed. However, as audiences seek to access multiple perspectives, certain streaming practices, primarily designed for delivering a single video stream, face challenges in accommodating this demand.

A main challenge is that static metadata and dynamic metadata for the video frames from different views (that are to be rendered and displayed at the same time on a display, e.g., a television screen (e.g., panel)) could be very different, but the hardware and algorithms of the single television display are not designed to configure and honor different metadata in different regions and/or windows on the display. Another challenge is that certain couplings (e.g., a coupling according to a High-Definition Multimedia Interface (HDMI) standard) do not support the transfer of multiple sets of different dynamic (e.g., high dynamic range (HDR)) metadata from a source streaming media device to a sink device (e.g., panel). Instead, certain (e.g., standard dynamic range (SDR)) video (e.g., frames) does not have different metadata from different views for rendering and display in multiview playback, and hence do not have the same challenge in that (e.g., SDR) multiview video playback.

BRIEF DESCRIPTION OF DRAWINGS

Various examples in accordance with the present disclosure will be described with reference to the following drawings.

FIG. 6 is a flow diagram illustrating operations of a method of combining dynamic metadata from multiple media files (e.g., videos) for multiview according to some examples.

DETAILED DESCRIPTION

Figure 1:
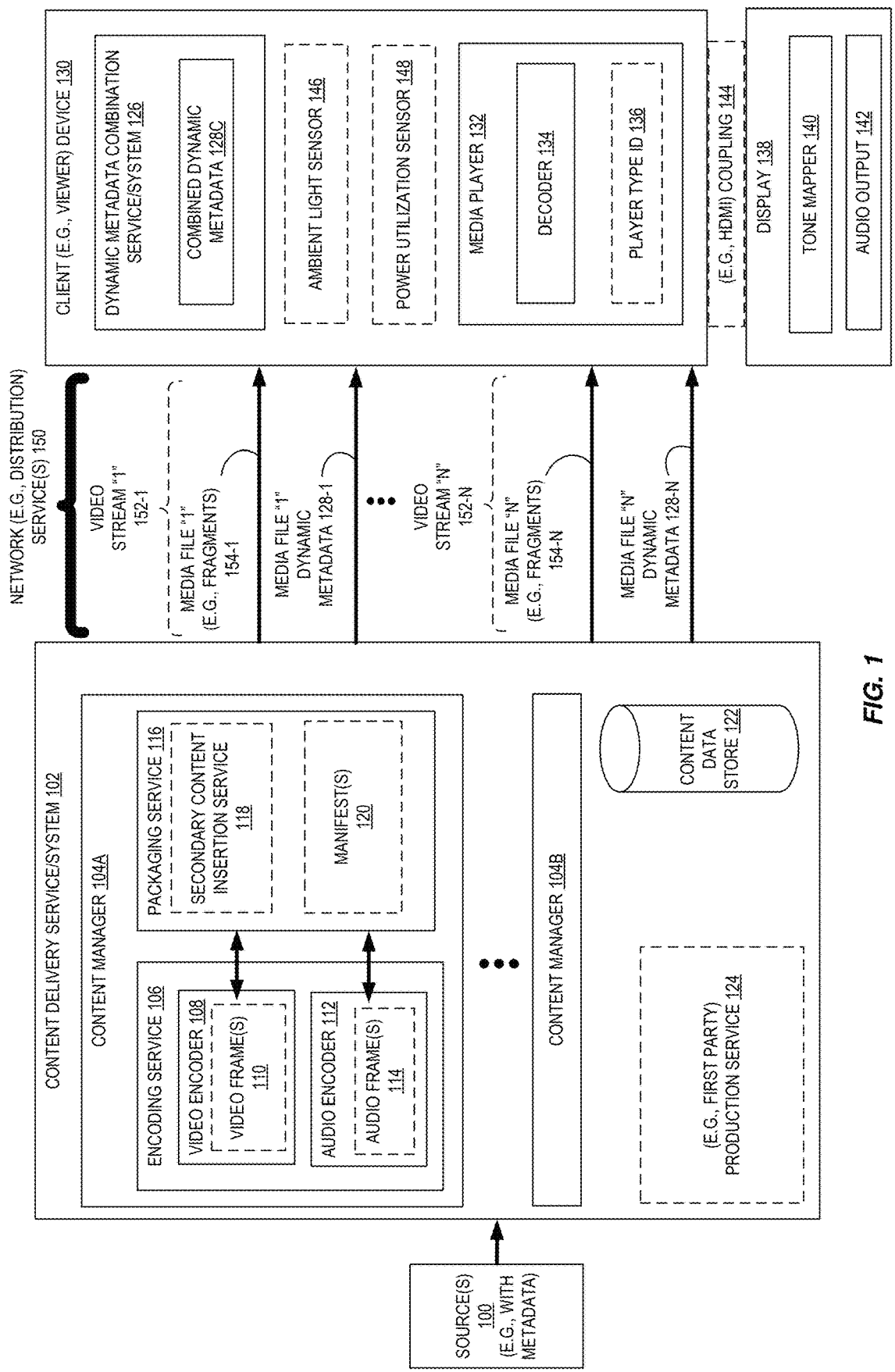
FIG. 1 is a diagram illustrating a content delivery service/system to send multiple video streams to a client device that includes a dynamic metadata combination service/system to combine dynamic metadata from the multiple video streams for multiple view (multiview) displaying according to some examples.

The present disclosure relates to methods, apparatus, systems, and non-transitory computer-readable storage media for combining dynamic metadata for multiple view (multiview) video displaying. Multiview display allows a client (e.g., customer) to see multiple video streams playing simultaneously. This can be different angles of the same event, a preview of one event while viewing another, or watching multiple events simultaneously.

In certain examples, dynamic metadata includes a "color value" type of dynamic metadata, e.g., brightness (e.g., luminance) dynamic metadata and/or color range (e.g., chrominance) dynamic metadata. Video coding (e.g., a "codec") that supports dynamic metadata (including, but not limited to, video coding according to an HDR10+ and/or Dolby Vision (e.g., Profile 8.1) standard) combines (i) (e.g., HDR) video with (ii) dynamic metadata that describes the image properties of each frame of the video, for example, where the dynamic metadata is frame-specific metadata embedded in a backwards-compatible supplemental enhancement information (SEI) message (e.g., where devices that cannot read the SEI message ignore those messages and fall back to using static metadata), e.g., an SEI message in a High Efficiency Video Coding (HEVC) standard bitstream. In certain examples, the dynamic metadata is used to improve tone mapping on a display, e.g., a display that supports that video coding standard. In certain (e.g., dark) viewing environments, dynamic metadata is used by a display's tone mapper to make better use of the display's (e.g., panel's) capabilities, for example, improving brightness, color saturation and accuracy, and general viewability. Certain displays (e.g., those that support an HDR10+ Adaptive coding standard and/or Dolby Vision IQ standard) combine the dynamic metadata with ambient light sensor data to dramatically improve adaptation to ambient light. This may be particularly important in sports, which are often watched in brighter rooms and/or in daytime.

As noted above, a technical problem is that while certain video coding standards allow for the simultaneous display of multiple views, they do not support utilizing (e.g., handling) dynamic metadata for multiple view (multiview) usage, e.g., where each stream would be expected to have different dynamic metadata from each other while they are being simultaneously displayed.

To overcome these technical problems, the examples herein provide a solution to generate a (e.g., single) set of combined dynamic metadata for multiple view (multiview) usage (e.g., multiple view video playback), e.g., for a current or future dynamic metadata format. In certain examples, the dynamic metadata is dynamic metadata for single view video playback, and multiple individual sets of dynamic metadata for single view video playback from corresponding video streams are combined into a (e.g., single set of) combined dynamic metadata for multiple view (multiview) usage (e.g., multiple view video playback). Certain examples herein do not modify the dynamic metadata (e.g., for single view video playback) generation (e.g., a dynamic metadata generation algorithm) from each video source (e.g., mezzanine file), e.g., video stream. Certain examples herein do not modify the dynamic metadata transmittal process to a client (e.g., viewer) device. Certain examples herein generate a (e.g., single) set of combined dynamic metadata (for multiple view (multiview) usage) by a client (e.g., viewer) device, for example, in contrast to combined dynamic metadata generated by a content delivery service/system.

Turning now to the figures, FIG. 1 is a diagram illustrating a content delivery service/system 102 to send multiple video streams 152-1 to 152-N (where N is a positive integer greater than 1) to a client (e.g., viewer) device 130 that includes a dynamic metadata combination service/system 126 to combine dynamic metadata 128-1 to 128-N from the multiple video streams for multiple view (multiview) displaying according to some examples.

In certain examples, client device 130 includes a media player 132 to play one or more video streams (e.g., live streams), for example, sent via network (e.g., distribution) services 150. In certain examples, media player 132 includes a decoder 134 to decode a video stream for viewing on display 138, e.g., displaying a video with multiple views therein.

Figure 4:
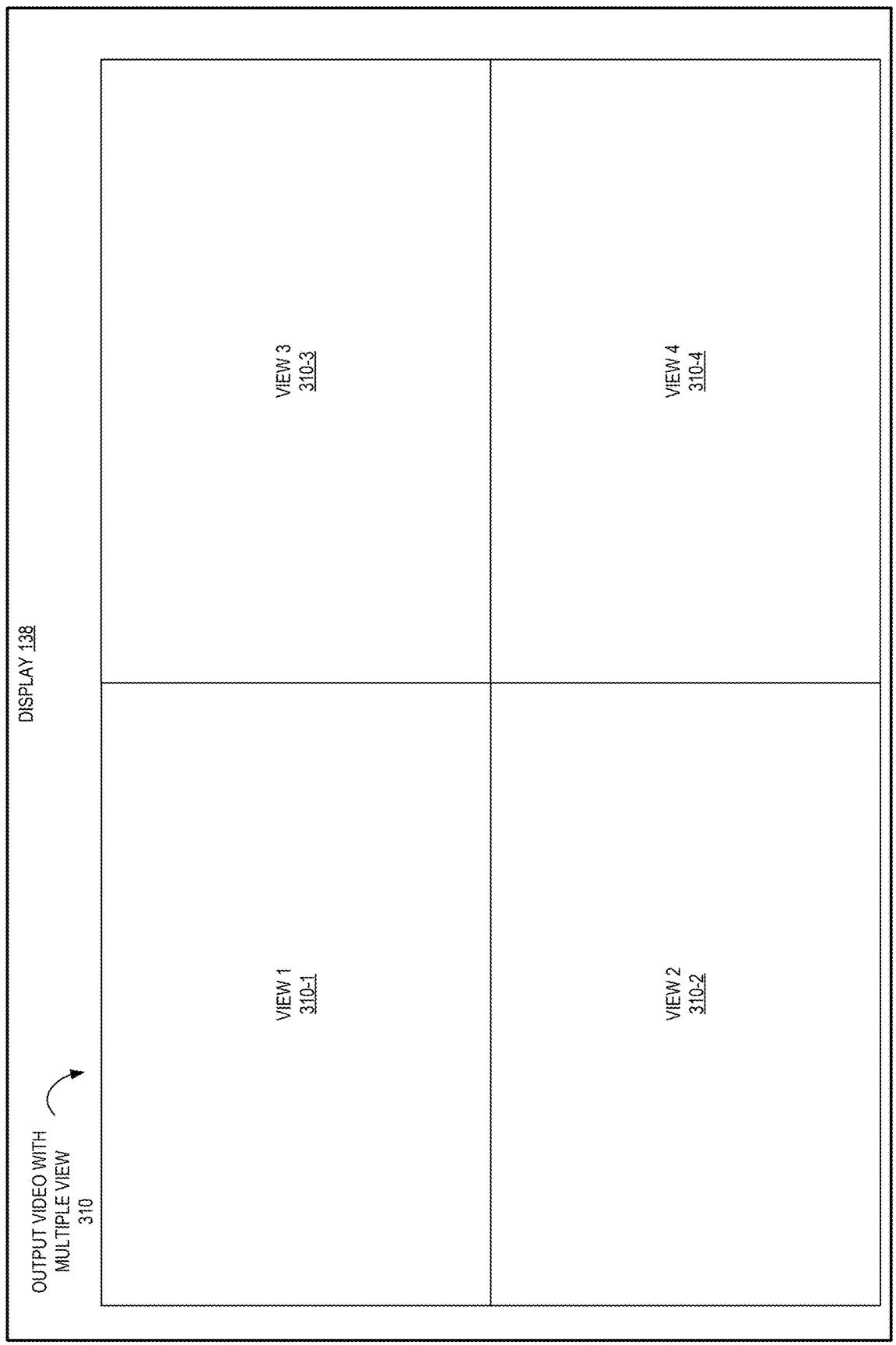
FIG. 4 is a diagram illustrating a display that is displaying an output video with multiview of four equal sized views (e.g., four equal sized videos) according to some examples.
Figure 5:
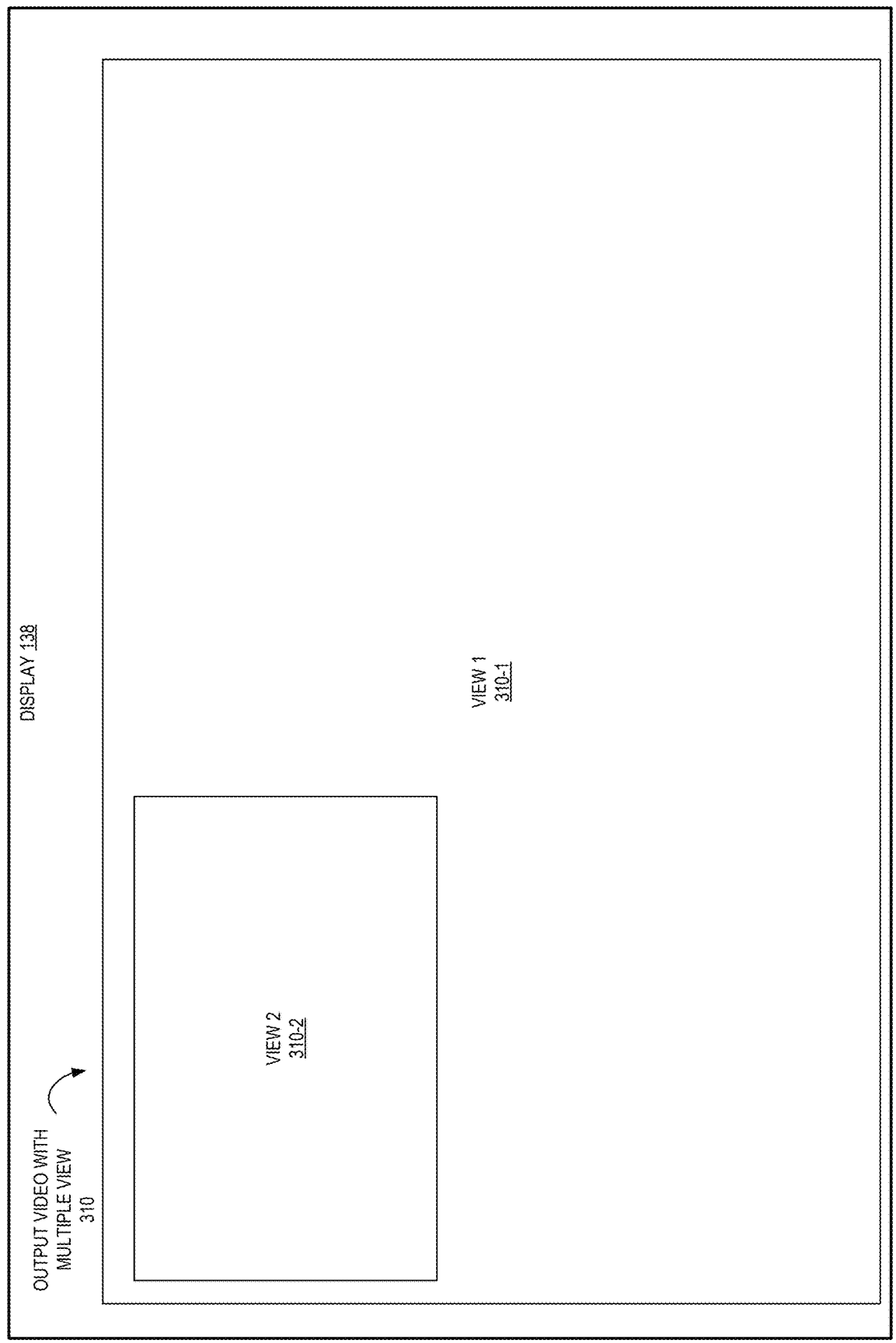
FIG. 5 is a diagram illustrating a display that is displaying an output video with multiview of two different sized views (e.g., two different sized videos) according to some examples.

In certain examples, the client device 130 is to combine multiple video streams 152-1 to 152-N for display, e.g., where (i) the multiple encoded video streams 152-1 to 152-N (e.g., media file (e.g., fragments) 154-1 of video stream 152-1 and media file (e.g., fragments) 154-N of video stream 152-N) are combined (e.g., on a slice and/or tile granularity) into a single encoded video stream that is decoded by a single decoder 134 or (ii) the multiple encoded video streams 152-1 to 152-N are decoded by a respective decoder 134 of a plurality of decoders, and the decoded videos are combined by the client device 130. Non-limiting example formats of multiple view output videos are depicted in FIGS. 4-5.

In certain examples, video (e.g., and a corresponding audio) is provided as source 100, for example, along with dynamic metadata (e.g., according to a video coding standard).

The depicted content delivery service/system 102 includes a content data store 122, which may be implemented in one or more data centers. As one example, a media file (e.g., including a video file and an audio file) (e.g., a media container) that is to be encoded is accessed from the content data store 122 by one or more content managers 104A-104B. In certain examples, the media file may be uploaded to content data store 122 by content provider(s) or provided directly (e.g., as live content) to one or more content managers 104A-104B by content provider(s) (e.g., from a live content encoder).

In certain examples, a content manager (e.g., described in reference to content manager 104A, but one or more other content managers 104B, etc. may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply (e.g., to include dynamic metadata), etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., video streams 152-1 to 152-N). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a standard that supports dynamic metadata, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and the secondary content, e.g., and the secondary content insertion service 118 is to insert the secondary content into the main content. In certain examples, client (e.g., viewer) device 130 supports multiview, e.g., and thus supports the simultaneous displaying of two or more (e.g., 3, 4, 5, 6, 7, 8, 9, 10, etc.) of video streams 152-1 to 152-N. In certain examples, the content delivery service/system 102 (e.g., encoding service 106) generates dynamic metadata 128-1 to 128-N, e.g., in parallel with encode (e.g., generate dynamic metadata per each source frame). In certain examples, the same dynamic metadata is used for each different video stream of the same source content, e.g., even if the resolutions of the video streams are different.

In certain examples, content delivery service/system 102 includes a (e.g., first party) production service 124, e.g., to allow multi-provider video production such that the video from two or more providers and/or the audio from two or more audio providers are combined into a single output as a dynamic mix (e.g., by a director). In certain examples, content delivery service/system 102 is to encode the resulting output and send that encoded content to one or more downstream entities (e.g., one or more instances of client device 130) as a single video stream, for example, via (e.g., wired and/or wireless) network services 150.

In certain examples, packaging service 116 includes one or more manifests 120, e.g., identifying the media file(s) (e.g., fragments, streams, etc.) to be output from content manager 104A. In certain examples, a manifest for a particular media file (e.g., a particular title) identifies a proper subset of video and audio representations of the media file for a particular client device 130 (e.g., based on the client's media player 132 (e.g., determined from its type ID value 136, display 138 resolution, audio output 142 capabilities, and/or available bandwidth)). In certain examples, the content is sourced from the content delivery service/system 102 in two parts: (i) the manifest 120 of all available media representations (e.g., their Uniform Resource Locator (URL) addresses and, optionally, other characteristics) and (ii) the media files (e.g., representations) (e.g., stream of fragments) and their dynamic metadata in a single (e.g., container) or multiple files. In certain examples, type ID value 136 indicates what standard(s) the display 138 (e.g., tone mapper 140) operates according to.

In certain examples, a client device 130 is to read (or store) a manifest 120 (e.g., sent in response to manifest request) before the client device may make a request for the media from that manifest, and thus access media files (e.g., audio fragments and corresponding video fragments) from media file content delivery service/system 102 (e.g., content data store 122), e.g., the URL for a live feed. In certain examples, to play video stream 1 152-1, a client device 130 is to read manifest (e.g., sent in response to a manifest request) before the client device may make a request for the media indicated by that manifest, and thus access media files (e.g., audio fragments and corresponding video fragments) from media file content delivery service/system 102 (e.g., content data store 122), e.g., the URL for video stream 1 152-1 (e.g., live feed 1).

In certain examples, a client device 130 is to simultaneously display (or cause the display of) multiple feeds, e.g., video stream 1 152-1 (e.g., live feed 1) and video stream N 152-N (e.g., live feed N). In certain examples, to also play video stream N 152-N, a client device 130 is to read manifest (e.g., sent in response to a manifest request) before the client device may make a request for the media indicated by that manifest, and thus access media files (e.g., audio fragments and corresponding video fragments) from media file content delivery service/system 102 (e.g., content data store 122), e.g., the URL for video stream N 152-N (e.g., live feed N).

Certain video streams include the video itself along with static metadata, for example, a video (e.g., HDR) file that include static metadata, e.g., maximum frame average light level (MaxFALL) static metadata indicating the average nits (e.g., candela per square meter) of a brightest frame in a file (e.g., title)) and/or maximum content light level (MaxCLL) static metadata indicating the brightest pixel in an entire file (e.g., entire title). In certain examples, this static metadata is ignored by a display (e.g., TV) as they commonly represent outliers and do not accurately describe the actual content. In certain examples, static metadata (e.g., global and/or track type metadata) is applied to an entire file (e.g., title).

Certain video streams include the video itself along with dynamic metadata, for example, a video (e.g., HDR10+ or Dolby Vision) file that includes dynamic metadata, for example, a "color value" type of dynamic metadata, e.g., brightness (e.g., luminance) dynamic metadata and/or color range (e.g., chrominance) dynamic metadata. In certain examples, the brightness (e.g., luminance) dynamic metadata is a histogram indicating how much of the frame uses a given brightness. In certain examples, the color range (e.g., chrominance or hue and saturation) dynamic metadata is a histogram indicating how much of the frame uses a given color range. In certain examples, an image (e.g., pixels thereof) includes corresponding luminance (component) blocks (e.g., "Y") and chroma (component) (e.g., U component=B'-Y' (blue-luma; blue difference) and V component=R'-Y' (red-luma; red-difference)). In certain examples, an image (e.g., pixels thereof) includes red, green, and blue (RGB) blocks. In certain examples, dynamic metadata (e.g., shot-based and/or frame-based metadata) is applied on a per-scene, per-shot, and/or per-frame basis (e.g., not an entire title, entire video playback session, or whole video sequence). In certain examples, dynamic metadata is utilized for specific cases involving dissolves, transitions, and/or animations. In certain examples, dynamic metadata is created during a color correction and/or grading process. In certain examples, a display panel is capable of a certain level of performance, e.g., a color range, peak brightness, and/or tone curve (e.g., that indicates how an input video's pixel values (e.g., input brightness and/or color) are mapped to a corresponding display's performance (e.g., display brightness and/or color). It should be understood that displays may have varying performance capabilities, and thus the dynamic metadata may be utilized to apply the input video's pixel values (e.g., input brightness and/or color) to the performance capabilities of the display (e.g., to maintain the relative difference in brightness and/or color between the pixels on the display).

However, in certain examples, it is not desirable or possible for display 138 (e.g., tone mapper 140 thereof) and/or coupling 144 (e.g., HDMI coupling) to process and/or transmit multiple sets of dynamic metadata for a single output video that includes multiple videos (and thus the multiple sets of dynamic metadata) shown simultaneously therein.

In certain examples, client device 130 includes a dynamic metadata combination service/system 126, e.g., to generate combined dynamic metadata 128C from corresponding dynamic metadata for each of a plurality of video streams. As one example, a combined video is formed from two video streams (e.g., as in FIG. 5) includes two sets of corresponding dynamic metadata, and dynamic metadata combination service/system 126 is to combine those two sets of corresponding dynamic metadata into a single set of combined dynamic metadata 128C. As another example, a combined video is formed from three video streams includes three sets of corresponding dynamic metadata, and dynamic metadata combination service/system 126 is to combine those three sets of corresponding dynamic metadata into a single set of combined dynamic metadata 128C. As yet another example, a combined video is formed from four video streams (e.g., as in FIG. 4) includes four sets of corresponding dynamic metadata, and dynamic metadata combination service/system 126 is to combine those four sets of corresponding dynamic metadata into a single set of combined dynamic metadata 128C. In certain examples, a change in the dynamic metadata of any video stream in a combined video triggers an update of the combined dynamic metadata 128C.

In certain examples, dynamic metadata combination service/system 126 is to generate combined dynamic metadata 128C by weighing (e.g., appropriating) the corresponding dynamic metadata (e.g., each value (e.g., for a band (e.g., bin or bucket)) from a histogram) by its relative area within the entire area of the multiview video. In certain examples, where a multiview video displays two videos of equal size, dynamic metadata combination service/system 126 is to generate the mean of the values for each histogram (e.g., from the one or more of the histogram bands that are in both videos) as the combined dynamic metadata 128C. In certain examples, for example, as in FIG. 4, where a multiview video displays four videos of equal size, dynamic metadata combination service/system 126 is to weight the values for each histogram (e.g., for the high histogram band) by a fourth and combine those four results as the combined dynamic metadata 128C. In certain examples, using such a weighting algorithm makes the combination of dynamic metadata into combined multiview dynamic metadata a process feasible to do in real time, e.g., within a client device (e.g., system-on-a-chip (SoC)) 130 (e.g., streaming media player thereof) connected to a display 138 (e.g., as in FIG. 1) or within a client device (e.g., SoC) 130 that includes a display 138 (e.g., as in FIG. 2). Although the above describes weighting based on a video's relative area within the multiview video, it should be understood that other combination algorithms may be utilized. In certain examples, dynamic metadata includes a histogram comprising a distribution index (for example, indices of 1, 5, 10, 25, 50, 75, 90, 95, and 99, e.g., as percentages of a frame that includes a corresponding value) and distribution values (e.g., the values that correspond to the indices). In certain examples, the distribution values are in average (or peak) nits.

Events that are described herein as occurring in real time or near real time can happen as instantaneously as possible, limited by certain factors such as the time required for transferring data (e.g., requests and responses) between computing devices, and the ability of computer hardware and software to process information. Real time (or near real time) can also mean immediately, as it happens; e.g., in the context of a system that processes data, these terms may mean processing data as it is received as opposed to storing or persisting the data once received for processing later on.

Examples herein are not capable of being performed by a human because combining dynamic metadata (e.g., and a tone mapping based on an input of the combined dynamic metadata) cannot practically be performed in the human mind (or by a human using a pen and paper), e.g., because such a solution is not practically scalable and extensible and cannot be performed in the available time between receipt of a request for a (e.g., media) file until a user expects to receive a response, e.g., to view a multiview video in real time.

Figure 3:
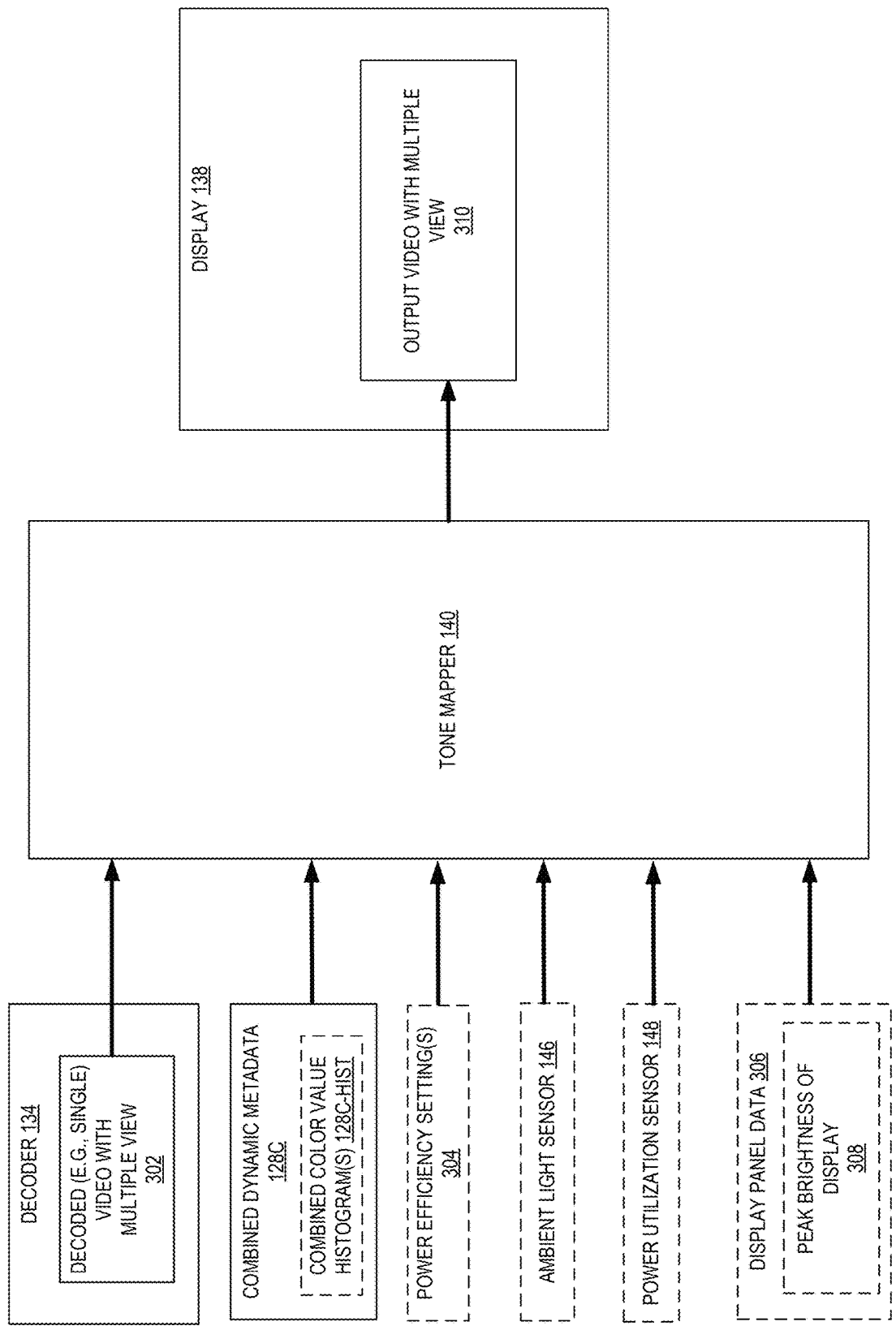
FIG. 3 is a diagram illustrating a tone mapper of a client device or display according to some examples.

In certain examples, display 138 includes a tone mapper 140, e.g., to that utilizes the dynamic metadata of a video stream (e.g., and one or more other inputs as discussed in reference to FIG. 3) to map (e.g., modify) the video (e.g., multiview video) to the display 138. In certain examples, the tone mapping includes modifying the input video's pixel values (e.g., input brightness and/or color) for a particular display 138 based on the combined dynamic metadata 128C. In certain examples, the tone mapping includes increasing or decreasing the pixel values. For example, it one example, a display has a peak luminance of 500 nits, but the scene, shot, or frame has a peak luminance of 4000 nits, certain examples of tone mapper 140 are to decrease the values of the pixels in the video based on the combined dynamic metadata 128C (e.g., histogram(s)), e.g., to maintain the (e.g., weighted) relative differences between the pixels in the scene, shot, or frame. Thus, in certain examples, the tone mapper 140 allows a display 138 to display (e.g., HDR) video (e.g., scene, shot, or frame) as close as reasonably possible to the reference version of that (e.g., HDR) video (e.g., scene, shot, or frame). In certain examples, different video standards utilize different tone mappers, e.g., different tone mapping algorithms thereof.

In certain examples, the tone mapper 140 does not support an input and/or processing of multiple sets of dynamic metadata, for example, but does support input and/or processing of a single set of combined dynamic metadata 128C (e.g., to improve the functioning of a display such that the video (e.g., image) is more visible, accurate to creative intent, and at an appropriate brightness in general). In certain examples, tone mapping is additive to whatever ambient light adaptation and/or picture mode a display uses. In certain examples (e.g., with HDR10+ Ambient or Dolby Vision IQ), ambient light adaptation is further improved. In certain examples, the tone mapper 140 takes an input a value from an ambient light sensor 146 (which may be in the client device 130 and/or display 138), e.g., in addition to the tone mapper 140 taking an input of the combined dynamic metadata 128C. In certain examples, the tone mapper 140 takes an input a value from a power utilization sensor 148 (which may be in the client device 130 and/or display 138), e.g., in addition to the tone mapper 140 taking an input of the combined dynamic metadata 128C.

In certain examples, the combined dynamic metadata 128C is sent (e.g., along with the multiview video) to display 138 via (e.g., electrical) coupling 144, e.g., HDMI coupling. In certain examples, the coupling 144 does not support sending multiple sets of dynamic metadata, e.g., but does support sending single set of combined dynamic metadata 128C. In certain examples, the display 138 does not include a tone mapper 140, e.g., and the combined dynamic metadata 128C is not utilized (e.g., the combined dynamic metadata 128C is ignored).

Figure 2:
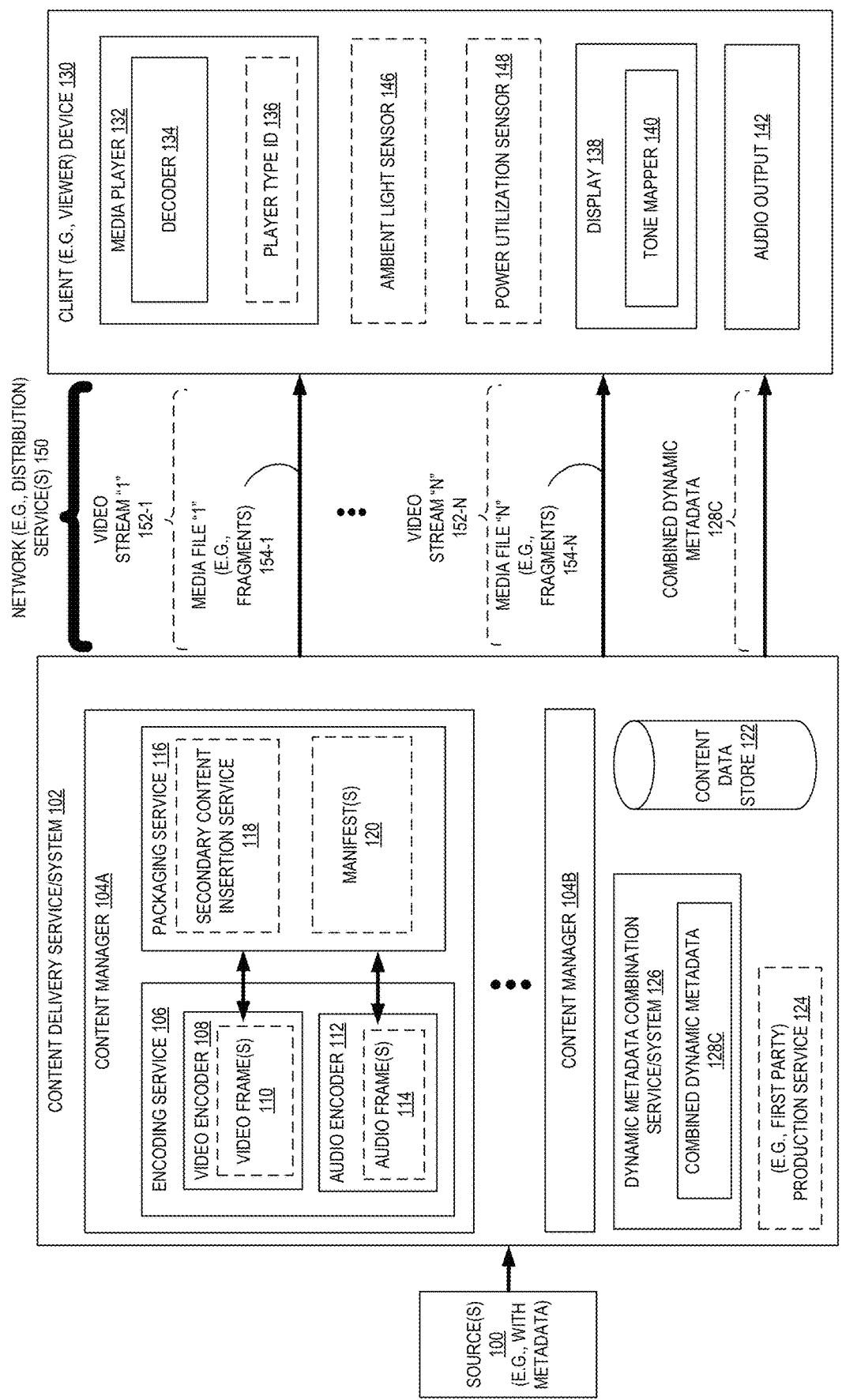
FIG. 2 is a diagram illustrating a content delivery service/system that includes a dynamic metadata combination service/system to combine dynamic metadata from multiple video streams and send the combined dynamic metadata and the multiple video streams to a client device for multiview displaying according to some examples.

FIG. 2 is a diagram illustrating a content delivery service/system 102 that includes a dynamic metadata combination service/system 126 to combine dynamic metadata from multiple video streams and send the combined dynamic metadata 128C and the multiple video streams 152-1 to 152-N to a client device 130 for multiview displaying according to some examples. In particular, FIG. 2 depicts where dynamic metadata combination service/system 126 is within the content delivery service/system 102, e.g., "server" side. In certain examples, the combine dynamic metadata 128C is sent to client device 130 already combined. FIG. 2 further illustrates where display 138 is within client device 130, although in other examples, display 138 may be separate from client device 130 (e.g., even when the dynamic metadata combination service/system 126 is within the content delivery service/system 102, e.g., "server" side).

FIG. 3 is a diagram illustrating a tone mapper 140 of a client device or display according to some examples. In certain examples, tone mapper 140 is to generate output video with multiple view 310 based on one or more (e.g., any combination of) decoded (e.g., single) video with multiple view 302, combined dynamic metadata 128C (e.g., combined color value histogram(s) 128C-HIST), power efficiency settings 304 (e.g., to maintain power consumption of display 138 below a threshold value (e.g., a threshold of power (e.g. watts) divided by the display (e.g., "screen") area), ambient light sensor 146 value, power utilization sensor 148 value, display panel data 306 (e.g., performance capabilities of the display), e.g., peak brightness 308 of display.

In certain examples, letter boxing where black bars (e.g., mattes) are applied to the top and the bottom of a frame (e.g., to maintain a desired aspect ratio) and/or pillar boxing where black bars (e.g., mattes) are applied to the left side and right side of a frame (e.g., to maintain a desired aspect ratio) are excluded from being part of dynamic metadata, e.g., they are not part of a dynamic metadata determination (e.g., by default).

However, with multiview video, there are certain examples where there is a (e.g., static) fill (e.g., black) region within a media playback frame (e.g., for the 2×2 grid in FIG. 4, where only three grids are utilized for video content, then the fourth grid may be just a black region), certain examples herein (e.g., of dynamic metadata combination service/system 126) include corresponding dynamic metadata for that fill (e.g., black) region, for example, a histogram for the black region (e.g., for optimal results). In certain examples, the dynamic metadata combination service/system 126 is to generate and/or include corresponding dynamic metadata for the fill (e.g., black) region in the generation of the combined dynamic metadata 128C. In certain examples, tone mapper 140 is tuned to meet a certain power efficiency setting 304, for example, a power utilization standard, such as, but not limited to, an Energy Star standard. So by including the (e.g., static) fill (e.g., black) region in the combined dynamic metadata 128C that utilizes less power, certain examples herein allow the use of more of the total power for the other (e.g., "active") region(s) (e.g., grid(s)) and thus for the active streams to be brighter and/or have better coloring.

In certain examples, there is a region within a media playback frame that presents static content (e.g., an image), and the dynamic metadata combination service/system 126 is to generate and/or include corresponding dynamic metadata for the static content region in the generation of the combined dynamic metadata 128C.

In certain examples, a "first" one or more videos of a set of videos to be displayed in multiview include dynamic metadata, but a "second" one or more other videos of the set of videos to be displayed in multiview do not include dynamic metadata, so the dynamic metadata combination service/system 126 is to generate (e.g., estimate) dynamic metadata for the "second" one or more other videos that do not include dynamic metadata, and that generated (e.g., estimated) dynamic metadata can then be combined with the dynamic metadata from the "first" one or more videos according to examples of this disclosure.

In certain examples, dynamic metadata combination service/system 126 is to convert dynamic metadata from a first standard to a second different standard, e.g., to convert in real time. Thus, certain examples herein support a multiview presentation of mixed dynamic metadata sources, e.g., generating new combined dynamic metadata in a single format, e.g., a single format that a client (e.g., viewer) device 130 and/or display 138 uses. One example is dynamic metadata combination service/system 126 converting one or more videos (of a set of videos to be displayed in multiview) from a first video standard (e.g., HDR10+) to a second video standard (e.g., Dolby Vision Profile 8.1), for example, so that a tone mapper 140 that operates according to the second video standard (e.g., a Dolby Vision tone mapper) can be used, e.g., using the dynamic metadata tone mapping (e.g., dynamic metadata tone mapping algorithm(s)) and/or ambient light adaption from the second video standard.

FIG. 4 is a diagram illustrating a display 138 that is displaying an output video 310 with multiview of four equal sized views (e.g., four equal sized videos for each of view 310-1, view 310-2, view 310-3, and view 310-4 respectively) according to some examples.

FIG. 5 is a diagram illustrating a display that is displaying an output video with multiview of two different sized views (e.g., two different sized videos in larger (e.g., primary) view 310-1 and smaller (e.g., secondary) view 310-2) according to some examples.

FIG. 6 is a flow diagram illustrating operations 600 of a method of combining dynamic metadata from multiple media files (e.g., videos) for multiview according to some examples. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 600 are performed by client device 130 and/or content delivery service/system 102.

The operations 600 include, at block 602, generating a first set of combined dynamic metadata for a first frame of a combined media based on a first set of dynamic metadata for a first frame of a first media of the combined media and a second set of dynamic metadata for a first frame of a second media of the combined media, and a second different set of combined dynamic metadata for a second frame of the combined media based on a third set of dynamic metadata for a second frame of the first media of the combined media and a fourth set of dynamic metadata for a second frame of the second media of the combined media. The operations 600 further include, at block 604, performing, by a tone mapper, a tone mapping of the combined media based on the first set of combined dynamic metadata and the second different set of combined dynamic metadata to generate an output media with multiple views. The operations 600 further include, at block 606, causing the output media to be presented or stored.

At least some examples of the disclosed technologies can be described in view of the following examples:

Example 1. A computer-implemented method comprising:
  receiving, by a client device, a first video comprising a first set of dynamic metadata including a corresponding first color value histogram for a plurality of frames of the first video, and a second video comprising a second set of dynamic metadata including a corresponding second color value histogram for a plurality of frames of the second video;
  combining the first video and the second video into a combined video;
  generating a first combined color value histogram for a first frame of the combined video based on a first color value histogram of the first set of dynamic metadata for a first frame of the first video and a second color value histogram of the second set of dynamic metadata for a first frame of the second video, and a second different combined color value histogram for a second frame of the combined video based on a third color value histogram of the first set of dynamic metadata for a second frame of the first video and a fourth color value histogram of the second set of dynamic metadata for a second frame of the second video;
  performing, by a tone mapper of the client device, a tone mapping of the combined video based on the first combined color value histogram and the second different combined color value histogram to generate an output video with multiple views; and sending the output video to a display or storage.

Example 2. The computer-implemented method of example 1, wherein the generating the first combined color value histogram comprises generating a first combined luminance value histogram for the first frame of the combined video based on a first luminance value histogram of the first set of dynamic metadata for the first frame of the first video and a second luminance value histogram of the second set of dynamic metadata for the first frame of the second video, and the generating the second different combined color value histogram comprises generating a second different combined luminance value histogram for the second frame of the combined video based on a third luminance value histogram of the first set of dynamic metadata for the second frame of the first video and a fourth luminance value histogram of the second set of dynamic metadata for the second frame of the second video.

Example 3. The computer-implemented method of example 1, wherein the generating the first combined color value histogram comprises weighing the first color value histogram for the first frame of the first video by a relative area of the first frame of the first video within the combined media, and weighing the second color value histogram for the first frame of the second media by a relative area of the second frame of the second media within the combined media.

Example 4. A computer-implemented method comprising:
generating a first set of combined dynamic metadata for a first frame of a combined media based on a first set of dynamic metadata for a first frame of a first media of the combined media and a second set of dynamic metadata for a first frame of a second media of the combined media, and a second different set of combined dynamic metadata for a second frame of the combined media based on a third set of dynamic metadata for a second frame of the first media of the combined media and a fourth set of dynamic metadata for a second frame of the second media of the combined media;
performing, by a tone mapper, a tone mapping of the combined media based on the first set of combined dynamic metadata and the second different set of combined dynamic metadata to generate an output media with multiple views; and causing the output media to be presented (e.g., to a display) or stored.

Example 5. The computer-implemented method of example 4, wherein the first set of combined dynamic metadata comprises a first set of luminance value metadata, and the second different set of combined dynamic metadata comprises a different set of luminance value metadata.

Example 6. The computer-implemented method of example 5, wherein the first set of luminance value metadata comprises a first luminance value histogram, and the second different set of combined dynamic metadata comprises a second luminance value histogram.

Example 7. The computer-implemented method of example 4, wherein the first set of combined dynamic metadata comprises a first set of chrominance value metadata, and the second different set of combined dynamic metadata comprises a different set of chrominance value metadata.

Example 8. The computer-implemented method of example 7, wherein the first set of chrominance value metadata comprises a first chrominance value histogram, and the second different set of combined dynamic metadata comprises a second chrominance value histogram.

Example 9. The computer-implemented method of example 4, wherein the generating the first set of combined dynamic metadata comprises weighing the first set of dynamic metadata for the first frame of the first media by a relative area of the first frame of the first media within the combined media, and weighing the second set of dynamic metadata for the first frame of the second media by a relative area of the second frame of the second media within the combined media.

Example 10. The computer-implemented method of example 9, wherein the relative area of the first frame of the first media within the combined media is greater than the relative area of the second frame of the second media within the combined media.

Example 11. The computer-implemented method of example 4, wherein the tone mapping of the combined media is also based on a power efficiency setting of a display displaying the output media.

Example 12. The computer-implemented method of example 4, wherein the combined media comprises the first media, the second media, and a black region within a media playback frame, and the performing, by the tone mapper, the tone mapping of the combined media is based on the first set of combined dynamic metadata, the second different set of combined dynamic metadata, and a set of dynamic metadata for the black region to generate the output media with multiple views.

Example 13. The computer-implemented method of example 4, wherein the tone mapping of the combined media is also based on an ambient light sensor value of a display displaying the output media.

Example 14. The computer-implemented method of example 4, wherein the generating the second different set of combined dynamic metadata is in response to detecting a change from the first set of dynamic metadata to the third set of dynamic metadata for the first media or a change from the second set of dynamic metadata to the fourth set of dynamic metadata for the second media.

Example 15. A non-transitory computer-readable medium storing code that, when executed by a device, causes the device to perform a method comprising:
generating a first set of combined dynamic metadata for a first frame of a combined media based on a first set of dynamic metadata for a first frame of a first media of the combined media and a second set of dynamic metadata for a first frame of a second media of the combined media, and a second different set of combined dynamic metadata for a second frame of the combined media based on a third set of dynamic metadata for a second frame of the first media of the combined media and a fourth set of dynamic metadata for a second frame of the second media of the combined media;
performing, by a tone mapper, a tone mapping of the combined media based on the first set of combined dynamic metadata and the second different set of combined dynamic metadata to generate an output media with multiple views; and
causing the output media to be presented (e.g., to a display) or stored.

Example 16. The non-transitory computer-readable medium of example 15, wherein the first set of combined dynamic metadata comprises a first set of luminance value metadata, and the second different set of combined dynamic metadata comprises a different set of luminance value metadata.

Example 17. The non-transitory computer-readable medium of example 15, wherein the first set of combined dynamic metadata comprises a first set of chrominance value metadata, and the second different set of combined dynamic metadata comprises a different set of chrominance value metadata.

Example 18. The non-transitory computer-readable medium of example 15, wherein the generating the first set of combined dynamic metadata comprises weighing the first set of dynamic metadata for the first frame of the first media by a relative area of the first frame of the first media within the combined media, and weighing the second set of dynamic metadata for the first frame of the second media by a relative area of the second frame of the second media within the combined media.

Example 19. The non-transitory computer-readable medium of example 15, wherein the combined media comprises the first media, the second media, and a black region within a media playback frame, and the performing, by the tone mapper, the tone mapping of the combined media is based on the first set of combined dynamic metadata, the second different set of combined dynamic metadata, and a set of dynamic metadata for the black region to generate the output media with multiple views.

Example 20. The non-transitory computer-readable medium of example 15, wherein the generating the second different set of combined dynamic metadata is in response to detecting a change from the first set of dynamic metadata to the third set of dynamic metadata for the first media or a change from the second set of dynamic metadata to the fourth set of dynamic metadata for the second media.

Exemplary environments, systems, etc. that the above may be used in are detailed below.

Figure 7:
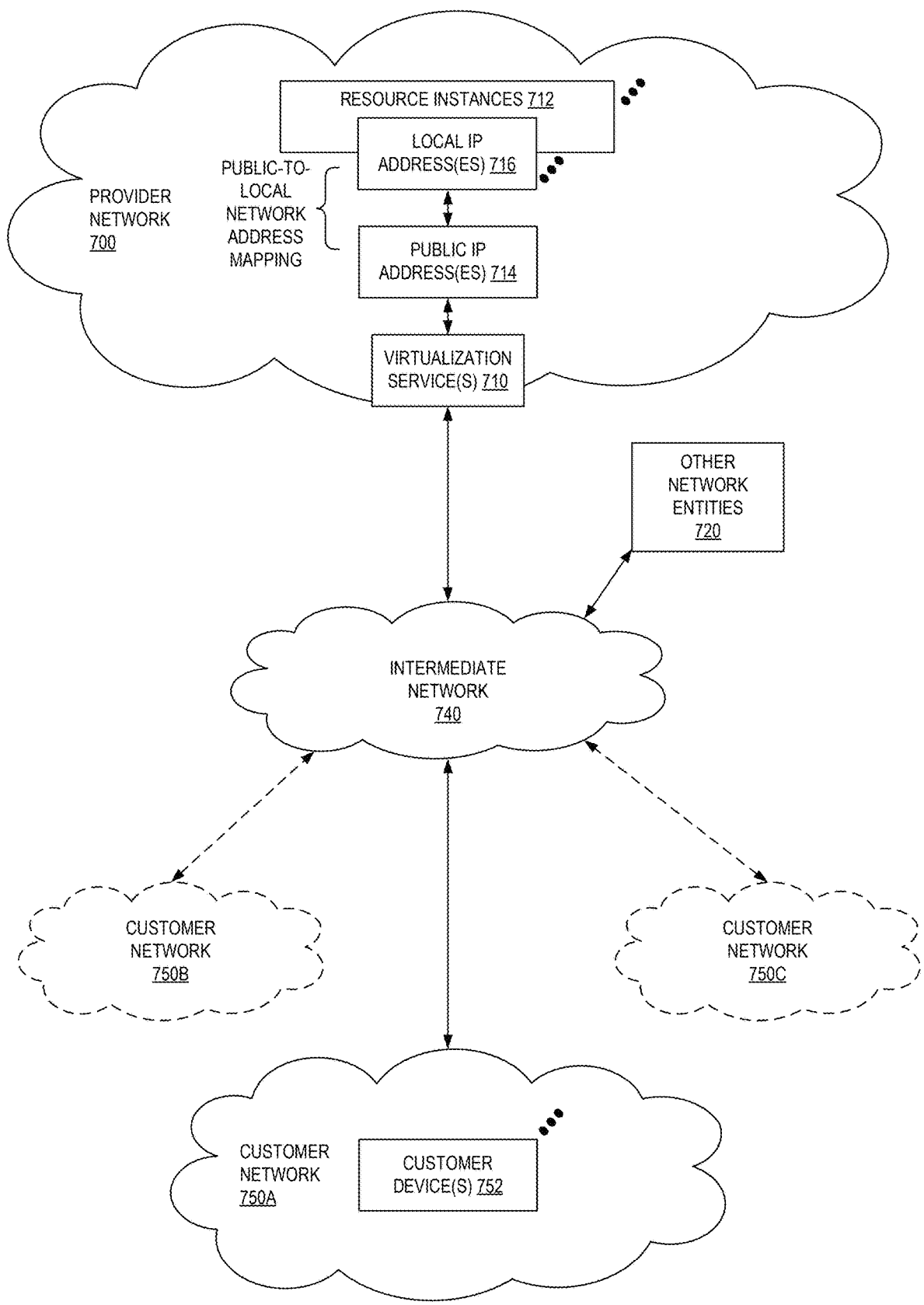
FIG. 7 illustrates an example provider network environment according to some examples.

FIG. 7 illustrates an example provider network (or "service provider system") environment according to some examples. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some examples, the provider network 700 may also provide public IP addresses 714 and/or public IP address ranges (e.g., Internet Protocol version 4 (IPv4) or Internet Protocol version 6 (Ipv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
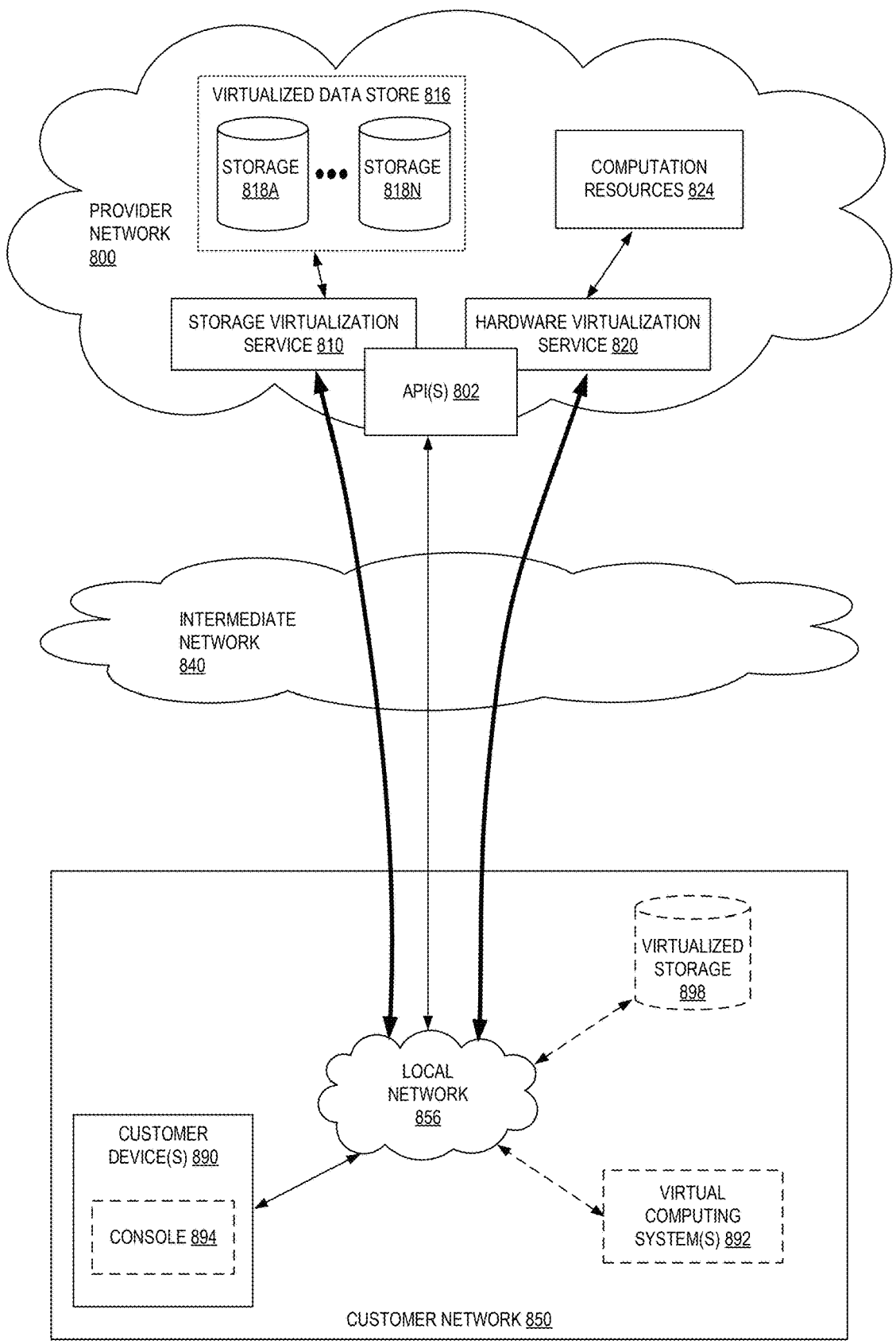
FIG. 8 is a block diagram of an example provider network that provides a storage service and a hardware virtualization service to customers according to some examples.

FIG. 8 is a block diagram of an example provider network that provides a storage service and a hardware virtualization service to customers, according to some examples. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some examples, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some examples, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some examples, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some examples, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
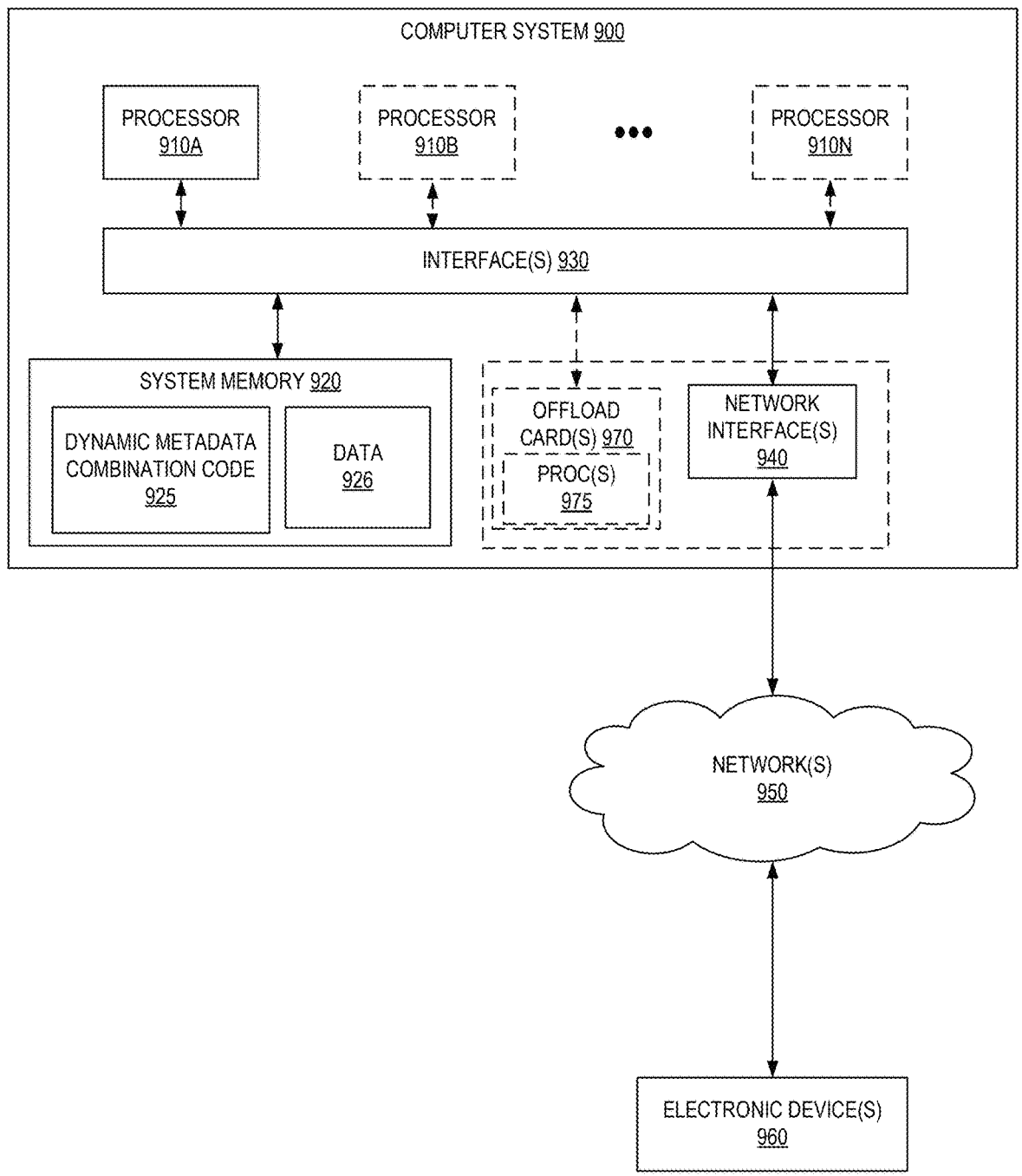
FIG. 9 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 900 illustrated in FIG. 9. In the illustrated example, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various examples a computer system 900 may include one computing device or any number of computing devices configured to work together as a single computer system 900.

In various examples, computer system 900 may be a uniprocessor system including one processor 910, or a multiprocessor system including several processors 910 (e.g., two, four, eight, or another suitable number). Processors 910 may be any suitable processors capable of executing instructions. For example, in various examples, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various examples, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 920 as dynamic metadata combination code 925 (e.g., executable to implement, in whole or in part, the operations discussed herein) and data 926.

In one example, I/O interface 930 may be configured to coordinate I/O traffic between processor 910, system memory 920, and any peripheral devices in the device, including network interface 940 or other peripheral interfaces. In some examples, I/O interface 930 may perform any necessary protocol, timing, or other data transformations to convert data signals from one component (e.g., system memory 920) into a format suitable for use by another component (e.g., processor 910). In some examples, I/O interface 930 may include support for devices attached through various types of peripheral buses, such as a variant of the Peripheral Component Interconnect (PCI) bus standard or the Universal Serial Bus (USB) standard, for example. In some examples, the function of I/O interface 930 may be split into two or more separate components, such as a north bridge and a south bridge, for example. Also, in some examples some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various examples, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some examples the offload card(s) 970 can perform compute instance management operations such as pausing and/or un-pausing compute instances, launching and/or terminating compute instances, performing memory transfer/copying operations, etc. These management operations may, in some examples, be performed by the offload card(s) 970 in coordination with a hypervisor (e.g., upon a request from a hypervisor) that is executed by the other processors 910A-910N of the computer system 900. However, in some examples the virtualization manager implemented by the offload card(s) 970 can accommodate requests from other entities (e.g., from compute instances themselves), and may not coordinate with (or service) any separate hypervisor.

In some examples, system memory 920 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
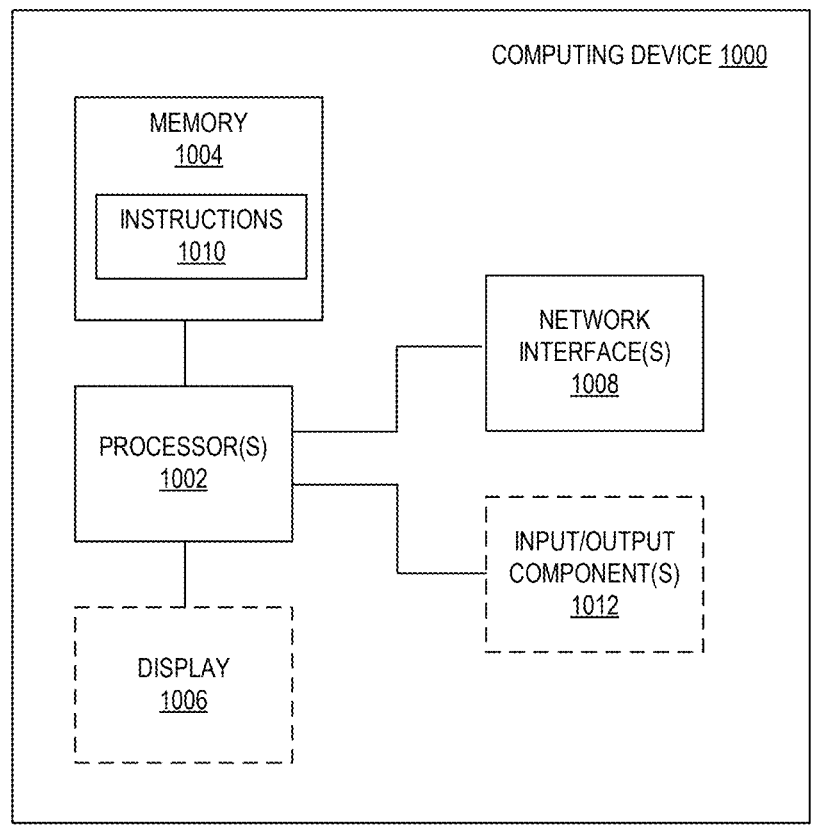
FIG. 10 illustrates a logical arrangement of a set of general components of an exemplary computing device that can be utilized in accordance with various examples.

FIG. 10 illustrates a logical arrangement of a set of general components of an example computing device 1000. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (for example, instructions 1010, e.g., which implement a content delivery service as disclosed herein), and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1010) for execution on the set of one or more processors 1002 of that electronic device. One or more parts of various examples may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some examples include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 11:
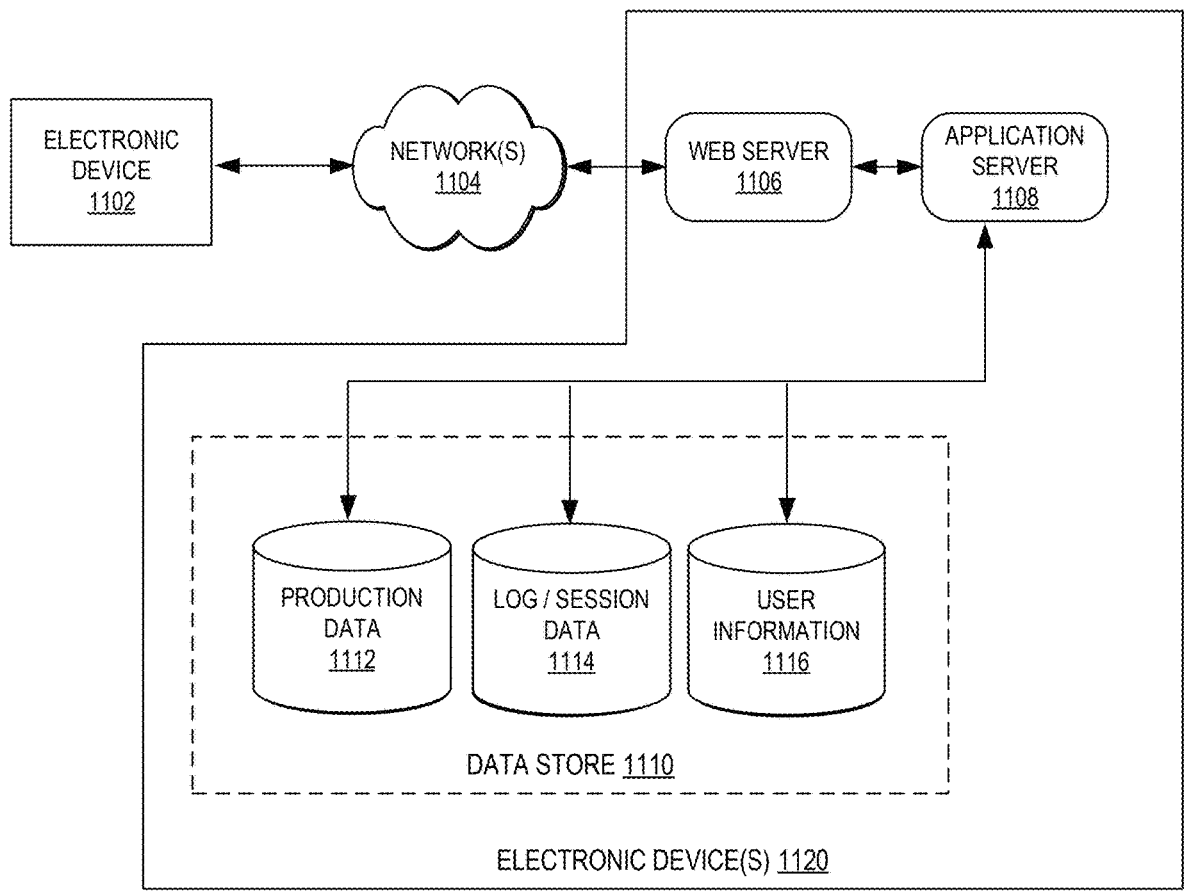
FIG. 11 illustrates an example of an environment for implementing aspects in accordance with various examples.

As discussed, different approaches can be implemented in various environments in accordance with the described examples. For example, FIG. 11 illustrates an example of an environment 1100 for implementing aspects in accordance with various examples. For example, in some examples messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various examples. The system includes an electronic client device 1102, which may also be referred to as a client device and can be any appropriate device operable to send and receive requests, messages, or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UpnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle, Microsoft, Sybase, IBM, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 818A-818N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "a certain example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a client device, a first video comprising a first set of dynamic metadata including a corresponding first color value histogram for a plurality of frames of the first video, and a second video comprising a second set of dynamic metadata including a corresponding second color value histogram for a plurality of frames of the second video;
   combining the first video and the second video into a combined video;
   generating a first combined color value histogram for a first frame of the combined video based on a first color value histogram of the first set of dynamic metadata for a first frame of the first video and a second color value histogram of the second set of dynamic metadata for a first frame of the second video, and a second different combined color value histogram for a second frame of the combined video based on a third color value histogram of the first set of dynamic metadata for a second frame of the first video and a fourth color value histogram of the second set of dynamic metadata for a second frame of the second video;

performing, by a tone mapper of the client device, a tone mapping of the combined video based on the first combined color value histogram and the second different combined color value histogram to generate an output video with multiple views; and sending the output video to a display or storage.

2. The computer-implemented method of claim 1, wherein the generating the first combined color value histogram comprises generating a first combined luminance value histogram for the first frame of the combined video based on a first luminance value histogram of the first set of dynamic metadata for the first frame of the first video and a second luminance value histogram of the second set of dynamic metadata for the first frame of the second video, and the generating the second different combined color value histogram comprises generating a second different combined luminance value histogram for the second frame of the combined video based on a third luminance value histogram of the first set of dynamic metadata for the second frame of the first video and a fourth luminance value histogram of the second set of dynamic metadata for the second frame of the second video.

3. The computer-implemented method of claim 1, wherein the generating the first combined color value histogram comprises weighing the first color value histogram for the first frame of the first video by a relative area of the first frame of the first video within the combined video, and weighing the second color value histogram for the first frame of the second video by a relative area of the second frame of the second video within the combined video.

4. A computer-implemented method comprising:
generating a first set of combined dynamic metadata for a first frame of a combined media based on a first set of dynamic metadata for a first frame of a first media of the combined media and a second set of dynamic metadata for a first frame of a second media of the combined media, and a second different set of combined dynamic metadata for a second frame of the combined media based on a third set of dynamic metadata for a second frame of the first media of the combined media and a fourth set of dynamic metadata for a second frame of the second media of the combined media;

performing, by a tone mapper, a tone mapping of the combined media based on the first set of combined dynamic metadata and the second different set of combined dynamic metadata to generate an output media with multiple views; and causing the output media to be presented or stored.

5. The computer-implemented method of claim 4, wherein the first set of combined dynamic metadata comprises a first set of luminance value metadata, and the second different set of combined dynamic metadata comprises a different set of luminance value metadata.

6. The computer-implemented method of claim 5, wherein the first set of luminance value metadata comprises a first luminance value histogram, and the second different set of combined dynamic metadata comprises a second luminance value histogram.

7. The computer-implemented method of claim 4, wherein the first set of combined dynamic metadata comprises a first set of chrominance value metadata, and the second different set of combined dynamic metadata comprises a different set of chrominance value metadata.

8. The computer-implemented method of claim 7, wherein the first set of chrominance value metadata comprises a first chrominance value histogram, and the second different set of combined dynamic metadata comprises a second chrominance value histogram.

9. The computer-implemented method of claim 4, wherein the generating the first set of combined dynamic metadata comprises weighing the first set of dynamic metadata for the first frame of the first media by a relative area of the first frame of the first media within the combined media, and weighing the second set of dynamic metadata for the first frame of the second media by a relative area of the second frame of the second media within the combined media.

10. The computer-implemented method of claim 9, wherein the relative area of the first frame of the first media within the combined media is greater than the relative area of the second frame of the second media within the combined media.

11. The computer-implemented method of claim 4, wherein the tone mapping of the combined media is also based on a power efficiency setting of a display displaying the output media.

12. The computer-implemented method of claim 4, wherein the combined media comprises the first media, the second media, and a black region within a media playback frame, and the performing, by the tone mapper, the tone mapping of the combined media is based on the first set of combined dynamic metadata, the second different set of combined dynamic metadata, and a set of dynamic metadata for the black region to generate the output media with multiple views.

13. The computer-implemented method of claim 4, wherein the tone mapping of the combined media is also based on an ambient light sensor value of a display displaying the output media.

14. The computer-implemented method of claim 4, wherein the generating the second different set of combined dynamic metadata is in response to detecting a change from the first set of dynamic metadata to the third set of dynamic metadata for the first media or a change from the second set of dynamic metadata to the fourth set of dynamic metadata for the second media.

15. A non-transitory computer-readable medium storing code that, when executed by a device, causes the device to perform a method comprising:
generating a first set of combined dynamic metadata for a first frame of a combined media based on a first set of dynamic metadata for a first frame of a first media of the combined media and a second set of dynamic metadata for a first frame of a second media of the combined media, and a second different set of combined dynamic metadata for a second frame of the combined media based on a third set of dynamic metadata for a second frame of the first media of the combined media and a fourth set of dynamic metadata for a second frame of the second media of the combined media;

performing, by a tone mapper, a tone mapping of the combined media based on the first set of combined dynamic metadata and the second different set of combined dynamic metadata to generate an output media with multiple views; and causing the output media to be presented or stored.

16. The non-transitory computer-readable medium of claim 15, wherein the first set of combined dynamic metadata comprises a first set of luminance value metadata, and the second different set of combined dynamic metadata comprises a different set of luminance value metadata.

17. The non-transitory computer-readable medium of claim 15, wherein the first set of combined dynamic metadata comprises a first set of chrominance value metadata, and the second different set of combined dynamic metadata comprises a different set of chrominance value metadata.

18. The non-transitory computer-readable medium of claim 15, wherein the generating the first set of combined dynamic metadata comprises weighing the first set of dynamic metadata for the first frame of the first media by a relative area of the first frame of the first media within the combined media, and weighing the second set of dynamic metadata for the first frame of the second media by a relative area of the second frame of the second media within the combined media.

19. The non-transitory computer-readable medium of claim 15, wherein the combined media comprises the first media, the second media, and a black region within a media playback frame, and the performing, by the tone mapper, the tone mapping of the combined media is based on the first set of combined dynamic metadata, the second different set of combined dynamic metadata, and a set of dynamic metadata for the black region to generate the output media with multiple views.

20. The non-transitory computer-readable medium of claim 15, wherein the generating the second different set of combined dynamic metadata is in response to detecting a change from the first set of dynamic metadata to the third set of dynamic metadata for the first media or a change from the second set of dynamic metadata to the fourth set of dynamic metadata for the second media.

* * * * *